Figure 2:
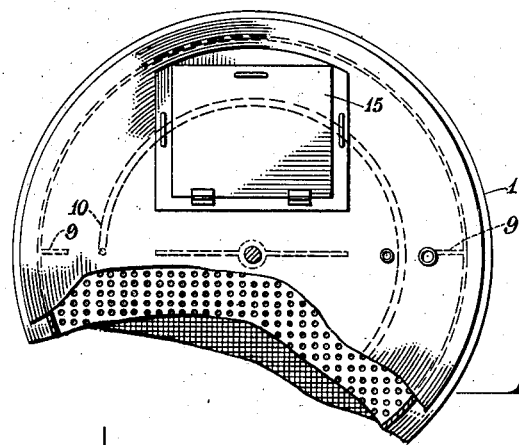

July 16, 1946.    R. M. CAVANAUGH    2,404,215
SLURRY FILTRATION
Filed Oct. 2, 1943

R. M. Cavanaugh INVENTOR.

BY *Thos. A. Wilson*
ATTORNEY

Patented July 16, 1946

2,404,215

UNITED STATES PATENT OFFICE 2,404,215

SLURRY FILTRATION

Robert Morris Cavanaugh, Woodbury, N. J., assignor to E. I. du Pont de Nemours & Company, Wilmington, Del., a corporation of Delaware Application October 2, 1943, Serial No. 504,711

6 Claims. (Cl. 210—62)

This invention relates to a new and improved process of filtration, and more particularly to the filtration of slurries having particles of diverse size.

The essential element in filtration is the filtering layer which brings about the isolation of the solid constituents from the liquid in a mixture. The rate of filtration for any given area of said layer depends, for the most part, on the extent to which the interstices thereof are kept free from interfering matter. For example, in filtering a material having particles of different size there is a tendency for the smaller particles to settle and choke the filter. This renders portions of the filter impervious and thus materially reduces the efficiency thereof. Due to this serious drawback, conventional methods of filtering materials of the type under discussion have rendered the operation tremendously slow, difficult and inadequate.

An object of this invention is a process for separating solid material of various sizes from another medium. A further object is a process for separating particles of non-uniform size from a liquid. A further object is a process for the isolation of the solid constituents from the liquid in a mixture, said solid matter comprising particles of at least two sizes. A still further object is to provide such a process by means of which filtration may be carried out quickly and without difficulty. Another object is a process for the filtration of slurries having different calibre grains, said process being characterized by a material increase in the rate of filtration per unit area of filtering surface without sacrifice of other features. Other objects and advantages will appear from the description hereinafter given.

In general, the foregoing disadvantages are obviated and the objects obtained according to this invention by introducing a liquid having solid particles of different size therein, such as, for example, an acid slurry of cyclotrimethylenetrinitramine, into a filtering vessel. Mechanical and air agitation is applied, the air being introduced from beneath the filter screens and serving both to agitate the slurry and to maintain maximum screen porosity by forcing most of the small grains, which otherwise would settle in the filter meshes and obstruct the passage of liquid therethrough, toward the surface of the slurry. As soon as the slurry has been agitated sufficiently, it is allowed to settle. Suction is applied and the acid is drawn off, leaving a slight layer of acid on the resulting cake for safety purposes. This procedure may be repeated until the desired quantity of cake is obtained. At this point suction is discontinued and water is sprayed into the top of the filter. Suction is applied again, causing the water to displace the acid in the interstices between the grains of said cake and leaving a small layer of water thereon. This displacement wash may be repeated until the cake has been reduced to the desired acidity. More water is introduced into the top of the filter and the cake is broken up by passing water or water and air up through the bottom of the screen. Mechanical agitation is started and the cyclotrimethylenetrinitramine is re-slurried and discharged for further processing.

In order to disclose my invention more fully, the following detailed description of one embodiment thereof is given in connection with the accompanying drawing, forming a part of this specification and serving as a convenient means of describing the principles of my novel and improved process, with the understanding, however, that the invention is not to be confined to any strict conformity with the showing of the drawing but may be changed or modified, provided such alterations mark no material departure from the essential features of the invention, as expressed in the appended patent claims.

Figure 1:
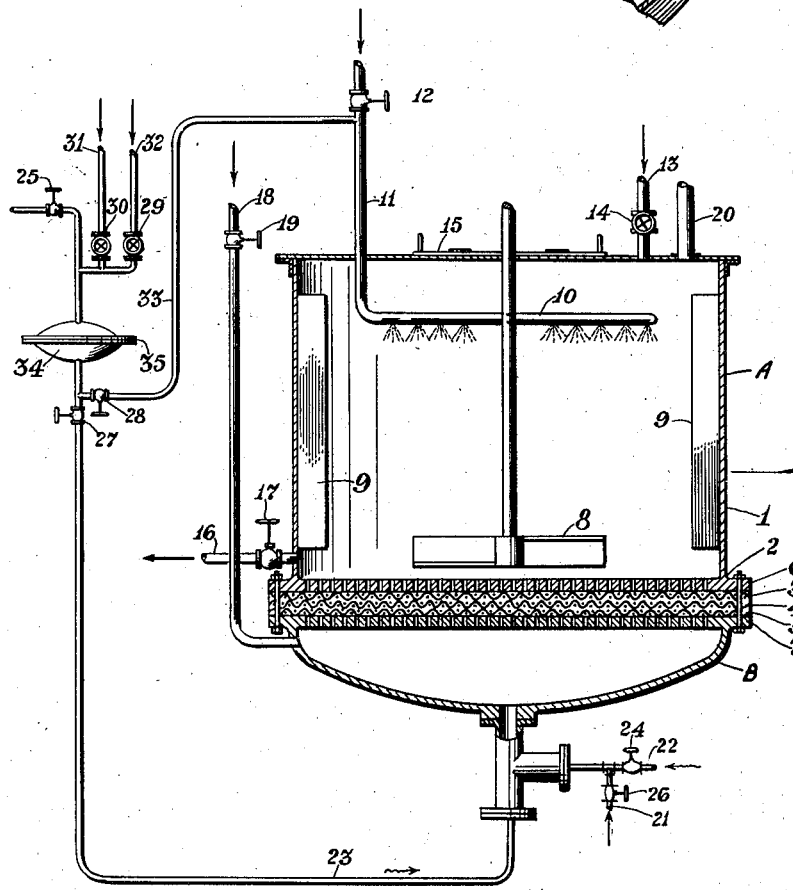

Figure 1 is a cross section view of a filter which may be employed in practicing this invention. Figure 2 shows the top of the container and the filter element broken away in parts.

Referring in greater detail to the drawing, the two primary parts of the filter I comprise an upper container A and a lower container B, flanged 2 at their point of union and fitted with a 6-mesh screen 3, a 500-mesh screen 4, followed by another 6-mesh screen 5, said screens being suitably reinforced on both sides by means of gratings 6 and 7. The screens extend beyond the inside diameter of the filter and between the flanges a sufficient distance to allow proper gripping therebetween. Gaskets surround the layers of screen between the flanges in order to prevent pinching of the screen and seepage of slurry from the filter. Within the filter is the agitator 8 of the flat paddle type having a 45° updraft pitch and located above and adjacent to the upper grating 6. Baffles 9 within the filter promote turbulence during agitation. A spray system 10, including a pipe having holes therein bored at 45° angles, is provided for the introduction of water supplied by conduit 11, the flow of water therethrough being regulated by means of valve 12. Inlet 13 is for the introduction of the slurry to be filtered, the slurry flow being controlled by means of valve 14. In the top of the filter is a door or manhole 15. Near the bottom and above the upper grating 6 is the outlet 16 and valve 17 for discharging the refined slurry. Beneath the lower grating 7 is a vent 18 and valve 19 for permitting air to pass into the lower compartment of the filter to aid in exiting the filtrate therefrom. There is also a fume ventilating duct 20, which is connected to the acid recovery system, in the top of the filter. Beneath and communicating with the filter are appropriately valved service lines 21, 22 and 23, through which water, air and suction, respectively, are applied. Line 23 has a cleanup filter 34 provided with a 500-mesh screen 35. This line is connected also to inlet 11 by means of conduit 33. The cleanup filter is serviced from above by an air conduit 31 and water conduit 32. The purpose of this filter is to prevent loss in the event of a break in, or passage of solid particles through the main screens.

The process comprising a preferred embodiment of this invention may be described as follows:

An acid slurry of cyclotrimethylenetrinitramine, commonly known as cyclonite, obtained from nitration, the grains of said solid material being of varoius sizes, is introduced into the filter 1 through conduit 13, the flow therethrough being regulated by means of valve 14. After the filter has been filled, valve 14 is closed, compressed air valve 24 is opened and rotation of the mechanical agitator 8 is started with a suitable driving means. The opening of the latter valve causes air to pass up through the bottom of the screens into the slurry during the rotation of agitator 8. The purpose of this air current is two-fold, the chief one being to remove the small grains of cyclonite from the screens, a secondary purpose being to assist in agitating the slurry. The optimum air current is one of just sufficient force to keep the small particles in suspension and away from the screen. In this manner, maximum screen porosity and therefore a maximum rate of filtration, other things being equal, is made possible. In the absence of such an air current, practically the opposite result would be obtained. That is, the small grains would settle in the screen meshes and impede the passage of liquid therethrough, even though the filtration were carried out under a high suction, thereby seriously reducing the efficiency of the filter. Following sufficient agitation, both air and mechanical agitation are discontinued and the cyclonite is allowed to settle. During this settling operation, the larger particles fall rapidly in the acid medium and tend to form a porous layer near the filter screens. The spent acid next is separated from the cyclonite by vacuum filtration through the screens 3, 4 and 5, the acid flowing into the base of the filter and on through outlet 23 and auxiliary screen 35 into a receiver tank from which it is taken to the acid area for reconcentration and reuse in the process. To facilitate this separation, suction of approximately 30 inches of mercury is applied beneath the screens by starting the steam jet on said receiver and opening valves 25 and 27. Filtration is continued until an acid layer of about one inch remains on the cake, after which valve 19 is opened. Valves 19, 25 and 27 are closed when air passes into the receiver tank, this being indicated by a loss of suction which is shown on a gauge. The steps described above may be repeated until the desired amount of cake is obtained. The spent acid thus recovered varies in strength from 45 to 75% depending on the starting acid strength and the particular process used previous to the filtration stage.

The cake of crystalline material wet with spent acid, some of which has been left in the cake as a safety measure, remains on the filter. To remove this, water is passed through the cake. Thus valves 28, 29 and 30 are opened causing water and air to pass through screen 35 into the filter by way of conduits 33, 11 and the spray system 10. Hence, solid particles which may pass through the main screen because of leakage therethrough are sent back to the filter, thereby minimizing waste and the hazard involved in reconcentrating contaminated acid. When the proper amount of water has been introduced, these valves are closed. Valves 25 and 27 are opened and the wash water filtered through the cake. Valve 19 is opened when one inch of wash water remains on the cake and 19, 25 and 27 are closed when air passes into the receiver tank. This receiver is vented after turning off the vacuum jet and the filtrate from the first wash water pumped, along with the spent acid from the previous filtration, to the acid storage for reconcentration.

The portion of the process in which the cake acid is displaced by water may be performed as many times as desirable; however, with the material under discussion it usually is carried out three times. The second and third displacement washes are accomplished in the same manner as the first, except the wash water is introduced, with valves 25 and 27 open, into the filter through conduit 11 by opening valve 12. In the second wash, valve 12 is opened also when one inch of liquid remains on the cake.

Ordinarily the volume of water used for each wash is approximately the volume of the cake. There is an important difference between the acid filtration and the wash water filtrations in that in the latter operations the cake is washed by displacement of the acid with water rather than reslurrying with water and refiltering. Thus the washing is accomplished with the cake undisturbed so that substantially all the particles thereof remain in the position in which they originally settled. The effluent from the first wash may be transferred to the weak acid storage where it awaits concentration so it can be used again in the process. Although the effluent from the succeeding washes ordinarily is too weak in acid to warrant concentrating, it is also reused in another portion of the process.

As is well known, washing a filter cake, which is obtained from a slurry from which it is desired to recover the filtrate without unnecessary dilution, by filtering water through it is more advantageous, other conditions being equal, than a "repulp" wash in that: (1) it requires less time, (2) permits recovery of considerable filtrate at high strength by making a cut at the desired point, and (3) requires less washing to reach a given crystal acidity.

When the washing is complete, the cake is reslurried with water and conveyed to storage through conduit 16 for further processing. Thus water and air are introduced into the filter by opening valves 12, 24 and 26, agitator 8 being started when the cake is sufficiently loose. These valves are closed when the slurry is of proper solids content, after which valve 17 is opened. Agitation is discontinued when the slurry level drops to the agitator blade, valve 17 being closed when the filter is drained. Suction, applied to the screen in removing the remaining charge, is cut off when air reaches the receiver tank. Normally, a satisfactory slurry is formed when the mixture comprises approximately 3.5 lbs. water per lb. of cyclonite.

My invention has increased the rate of filtration of cyclonite from 290 lbs. per hour according to the commonly used method of the prior art to 470 lbs. per hour. The increase in rate of filtration of other materials realized by this invention over conventional methods are comparable to that realized in the filtration of cyclonite.

While the invention has been described with reference to cyclonite, for the sake of concreteness, it is to be understood that the process is by no means restricted thereto, and that many modifications can be made without departing from the scope of the present invention. For example, the invention in its preferred application may be employed for the filtration and treatment of materials having particles of at least two sizes, such as tetryl, ethylenedinitramine, pentaerythritol tetranitrate, sand and the like. The invention is applicable to substantially all materials, however when they are produced in such manner as to cause formation of different size crystals. Further, such conditions as filtration temperature, volume of wash water, ratio of water to refined solid in the reslurry, amount of suction applied, and the apparatus in general may be varied widely. For instance, it has been found according to this invention that the temperature of filtration may be varied over a range of about 20° to 60° F. without any material effect on the advance made by said invention. Nor is the invention limited to a process in which suction is applied to facilitate filtration, although the use of suction is preferred. Moreover, my invention is applicable not only to acid slurries but also to liquid slurries in general. In the latter case, recovery of the filtrate may not be desired, in which event dilution of the filtrate would be immaterial. Therefore, instead of washing the cake by displacement, it may be accomplished by a "repulp" or reslurry. Likewise, in dealing with certain materials it may not be necessary to use the clean-up filter. Obviously these and other conditions will depend on the material being processed. Nor is the liquid which is used to wash the cake limited to water, since others that will accomplish the desired purification may be employed.

Although hereinbefore I have made an effort to render my invention more readily understood by describing it in detail and citing specific applications thereof, it will be appreciated that said specific disclosure and the discussion of the theories or principles underlying my process are for the purpose of clarity only and are not to be construed as a limitation on the present invention as more broadly made known.

I intend to be limited only by the appended patent claims.

I claim:

1. The process of separating solid particles of unlike size from a liquid which comprises introducing the liquid containing said solid into a vessel having a filter across the bottom thereof, passing air up through the filter therein, thereby forcing said particles into suspension, stopping the upward flow of air causing the large particles to settle by gravity upon said filter, causing the liquid to flow through the filter by the application of suction thereunder, reslurrying the cake thus formed with water, passing air up through the filter and thereby maintaining the particles in suspension, discontinuing the passing of air to allow the large particles to settle, passing the wash liquid through the filter and removing the solid from said vessel.

2. The process of separating diverse size solid particles from a liquid which comprises introducing the liquid containing the solid into a vessel having a filter across the bottom thereof, passing air up through the filter therein, thereby forcing the particles into suspension, stopping the upward flow of air allowing the large particles to settle by gravity upon said filter, aiding the flow of liquid through the filter by means of a vacuum, and subsequently removing the solid from said filter.

3. The process of separating multi-size solid particles from a liquid which comprises introducing the liquid containing the solid into a vessel having a filter across the bottom thereof and agitating same, passing air up through the filter therein, thereby forcing the particles into suspension, stopping the upward flow of air allowing the large particles to settle by gravity upon said filter, causing the liquid to flow through the filter, removing substantially all of the recoverable liquid remaining in the interstices between the particles by water displacement, reslurring the solid with water and removing the slurry from said vessel.

4. The process of separating different size particles of cyclonite from a spent acid solution which comprises introducing the cyclonite solution into a vessel having a filter across the bottom thereof and agitating same, passing air up through the filter therein, thereby maintaining the particles in suspension, stopping the upward flow of air allowing the large particles to settle by gravity upon said filter, causing the acid to flow through the filter by the application of suction thereunder, removing substantially all of the recoverable acid remaining on the cake thus formed and in the interstices between the particles thereof by at least one water displacement treatment, causing the acid and water to pass through said filter, forming a water slurry of the refined cyclonite and removing same from said vessel.

5. The process of separating particles of cyclonite from a spent acid solution which comprises introducing the said cyclonite solution into a vessel having a filter across the bottom thereof and agitating same, passing air up through the filter therein, thereby maintaining the particles in suspension, stopping the upward flow of air allowing the particles to settle upon said filter, causing the acid to flow through the filter and aiding said flow therethrough by applying suction thereunder, providing a container under the filter, withdrawing the acid from the container beneath said filter and assisting said withdrawal by allowing air to pass into said container through a vent therein, removing substantially all of the recoverable acid remaining on the solid thus formed and in the interstices between the particles thereof by at least one water displacement wash, causing the acid and water to pass through said filter into said container, promoting the passage of acid and water through the filter by means of suction, withdrawing the acid and water from said container and aiding said removal by allowing air to pass into said container through a vent therein, forming a slurry of the refined cyclonite and removing same from said vessel, said process being carried out in such manner that at least the first filtrate is passed through a clean-up filter and the liquid for the first displacement wash subsequently is passed, together with air, through said clean-up filter before introduction into the filter vessel, said wash liquid being passed through the clean-up filter in the opposite direction to that in which said filtrate passed.

6. The process of separating solid particles of various size from a liquid which comprises introducing the liquid containing said solid into a vessel having a filter across the bottom thereof and agitating same, passing air up through the filter therein, thereby keeping said particles in suspension, stopping the upward flow of air allowing the large particles to settle desirably upon said filter by gravity, causing the liquid to flow through the filter and aiding said flow therethrough by applying suction thereunder, providing a container under said filter, withdrawing the liquid from the container beneath said filter and assisting said withdrawal by allowing air to pass into said container through a vent therein, removing substantially all of the recoverable liquid remaining on the solid thus formed and in the interstices between the particles thereof by at least one liquid displacement treatment, causing the liquid to pass through said filter into said container, promoting the passage of liquid through the filter by applying suction thereto, removing the liquid from said container and aiding said removal by allowing air to pass thereinto through a vent therein, forming a slurry of the refined solid and removing same from said vessel, said process being carried out in such a manner that the first filtrate is passed through a clean-up filter and the liquid for the first displacement wash subsequently is passed, together with air, through said clean-up filter before introduction into the filter vessel, said wash liquid being passed through the clean-up filter in the opposite direction to that in which said filtrate passed.

ROBERT MORRIS CAVANAUGH.